United States Patent [19]

Wright

[11] Patent Number: 5,216,533
[45] Date of Patent: Jun. 1, 1993

[54] MOTOR MOTION DETECTION CIRCUIT

[75] Inventor: George C. Wright, Duvall, Wash.

[73] Assignee: Intermec Corporation, Lynnwood, Wash.

[21] Appl. No.: 818,411

[22] Filed: Jan. 3, 1992

Related U.S. Application Data

[63] Continuation of Ser. No. 403,504, Oct. 31, 1989, abandoned.

[51] Int. Cl.$^5$ .................. G02B 26/08; G05B 19/40
[52] U.S. Cl. .................. 359/199; 318/685; 318/696
[58] Field of Search .................. 350/6.1–6.91; 250/234–236; 318/685, 696; 235/467, 472; 359/196–226

[56] References Cited

U.S. PATENT DOCUMENTS

| | | | |
|---|---|---|---|
| 3,623,060 | 11/1971 | Welch | 250/236 |
| 3,935,447 | 1/1976 | Black et al. | 250/236 |
| 4,025,761 | 5/1977 | Hayosh et al. | 235/467 |
| 4,034,230 | 7/1977 | Brill et al. | 250/568 |
| 4,097,729 | 6/1978 | Seligman et al. | 235/467 |
| 4,282,431 | 8/1981 | Anthony, Jr. et al. | 250/236 |
| 4,450,350 | 5/1984 | Hardy | 235/467 |
| 4,473,746 | 9/1984 | Edmonds | 250/216 |
| 4,555,653 | 11/1985 | Nawala et al. | 318/685 |
| 4,575,625 | 3/1986 | Knowles | 235/467 |
| 4,593,186 | 6/1986 | Swartz et al. | 235/472 |
| 4,672,283 | 6/1987 | Kobayashi | 318/696 |
| 4,692,603 | 9/1987 | Brass et al. | 235/454 |
| 4,710,615 | 12/1987 | Meyers | 235/454 |
| 4,736,095 | 4/1988 | Shephard et al. | 235/472 |
| 4,739,346 | 4/1988 | Buckley | 318/696 |
| 4,742,287 | 5/1988 | Yokoi et al. | 318/696 |
| 4,760,320 | 7/1988 | Tsugita | 318/685 |
| 4,794,240 | 12/1988 | Schorr et al. | 235/467 |
| 4,799,164 | 1/1989 | Hellekson et al. | 235/467 |
| 4,808,804 | 2/1989 | Krichever et al. | 235/462 |
| 4,833,387 | 5/1989 | Pfeiffer | 318/685 |
| 4,851,755 | 7/1989 | Fincher | 318/685 |
| 4,992,717 | 2/1991 | Marwin et al. | 235/472 |

Primary Examiner—Bruce Y. Arnold
Assistant Examiner—Thong Nguyen
Attorney, Agent, or Firm—Seed and Berry

[57] ABSTRACT

A circuit for detecting the motion of an oscillating motor driving a mirror for causing a light beam to scan. The circuit is included in a laser scanner for illuminating and reading bar codes, and detects the presence of conditions which prevent the motor from moving, such as a broken wire in a winding. The motor has two windings which are driven by a logic device to cause the motor to oscillate between two extreme angular positions. Each winding has two legs. The voltage on at least one of the legs is monitored when the leg is not being driven by the logic device, to detect the presence of an electromotive force voltage produced by motion of the motor. The monitored voltage is conditioned and transmitted to the logic device. In one embodiment, the monitored voltage is sampled twice and the two samples compared to provide an indication whether the motor is moving.

19 Claims, 5 Drawing Sheets

MOTOR MOTION DETECTION CIRCUIT

CROSS-REFERENCE TO RELATED APPLICATION

This application is a continuation of U.S. application Ser. No. 07/403,504, filed Oct. 31, 1989, now abandoned.

TECHNICAL FIELD

This invention relates to a motor motion detection circuit and, more particularly, to a motor motion detection circuit for use with a bar code scanning reader.

BACKGROUND ART

A bar code reader typically uses a beam of light to read a bar code, which consists of alternating strips ("bars") of differing reflectivities. The scanner then receives and interprets the fluctuations in the returning light that are caused by the bar code. It is known in the prior art to read bar codes by means of a hand-held wand which makes contact with the surface on which the bar code is printed. However, the need to make contact with the surface is frequently inconvenient and gives uninterpretable readings because the wand is not moved across the bar code with a sufficiently uniform velocity.

An alternative to a hand-held wand is a scanning reader which does not require physical contact with the bar code which is to be read. A scanning reader typically produces a beam of light which is repetitively scanned across an area. If the beam of light intercepts a bar code (or some other symbology), the modulated light which is reflected by the bar code is returned to sensing circuitry in the scanning reader for interpretation. The received signal is analyzed on the basis of relative time. That is, the widths of the alternating areas of different reflectivity are measured on the basis of their relative scanning times. This allows the reader to be used with bar codes which have a wide variety of sizes, the important factor being that the relative widths of the elements of the bar codes be preserved. Accordingly, it is preferable that the light beam be scanned across the bar code at a substantially uniform rate in order to ease the task of interpreting the bar code.

In order to insure that the light beam is scanned at a substantially uniform rate, it is typically reflected from a mirror within the scanner that moves repetitively at a uniform rate. The mirror is generally driven by a small electrical motor under the control of electronic control circuitry. The mirror is typically either rotating at a constant speed or oscillating on the end of a shaft attached to a motor which can step between two extreme angular positions. Examples of rotating optical elements are shown in U.S. Pat. Nos. 4,025,761, 4,097,729, 4,450,350, 4,575,625, and 4,692,603. Examples of oscillating mirror optical elements are shown in U.S. Pat. Nos. 4,593,186, 4,736,095, and 4,808,804. In hand-held applications, an oscillating mirror is generally preferable, since it can be made both lighter and more compactly than a rotating optical element.

The light source in a modern bar code scanner is generally a very low power solid state laser device, since such devices are efficient and light, and they can be made reliably and relatively inexpensively. However, the Bureau of Radiological Health has placed restrictions on the amount of laser radiation an individual should be subjected to. A variety of solutions have been developed to reduce the amount of laser light a scanner can produce. These include methods for modulating the laser and for turning off the laser when it is not in use. Another method is to park the laser when the reader is not scanning so that the light it is producing is retained within the scanning reader. However, it is possible for the scanning mirror to become inoperative, possibly transmitting laser light when it is not needed. Therefore, it is useful to be able to detect if the scanning motor has become inoperative, so that the laser can be turned off and other remedial action taken to repair the scanner. This problem has not been discussed in the prior art, including the U.S. Pat. Nos. cited above.

DISCLOSURE OF THE INVENTION

It is an object of the present invention to provide a circuit for sensing if a scanning mirror has stopped moving.

It is another object of the present invention to maintain the safe operation of a scanning laser bar code reader by interrupting the operation of the laser light source if the scanning mirror has stopped oscillating.

It is a further object of the present invention to improve the operating efficiency of a scanning laser bar code reader by ensuring that the laser light source is operative only when the scanning mirror is oscillating.

These and other objects can be provided by a motor motion detection circuit for a scanning device that produces an oscillatory motion of an optical element. In general, the circuit comprises a stepper motor and means for producing a motor motion detection signal. The stepper motor is connected to the optical element and has two center-tapped windings, each with two legs attached to its center. The center of each of the windings is held at a substantially fixed first voltage. The ends of each of the two legs of each of the center-tapped windings is periodically connected to a second voltage that is different from the first voltage. The two ends of each of the windings are otherwise not connected to a voltage. Connection to the second voltage drives the motor in the oscillatory motion. The windings are arranged so that any motion of the motor produces electromotive force voltages in each of the windings. The means for producing a motor motion detection signal operates when it detects at least one electromotive force voltage in a winding leg during a time when the end of the winding leg is not connected to the second voltage. In some embodiments, the means for producing a motor motion detection signal can be a logic circuit.

In a specific embodiment, the invention can also be a scanning device for producing an oscillating scanning beam of light for reading a symbology. The scanning device comprises means for producing a beam of light, an optical element, means for directing at least a portion of a beam of light onto the optical element and a voltage-producing means for producing a substantially fixed first voltage. The optical element redirects the beam of light toward the symbology.

The invention also comprises a stepper motor connected to the optical element and the voltage-producing means. The stepper motor has two center-tapped windings, each of the windings having two legs connected to its center. The center of each of the center-tapped windings is held at the substantially fixed first voltage and each of the two ends of each of the center-tapped windings is periodically held at a second voltage that is different from the first voltage. This drives the motor in an oscillatory scanning motion. The two ends of each of the windings are otherwise not connected to a voltage. The windings are arranged so that any motion of the motor produces electromotive force voltages in each of the windings.

Further, this embodiment of the invention comprises means for producing a motor motion detection signal when it detects at least one electromotive force voltage in a winding at a time when the end of the winding is not held at the second voltage.

BEST MODES FOR CARRYING OUT THE INVENTION

Figure 1:
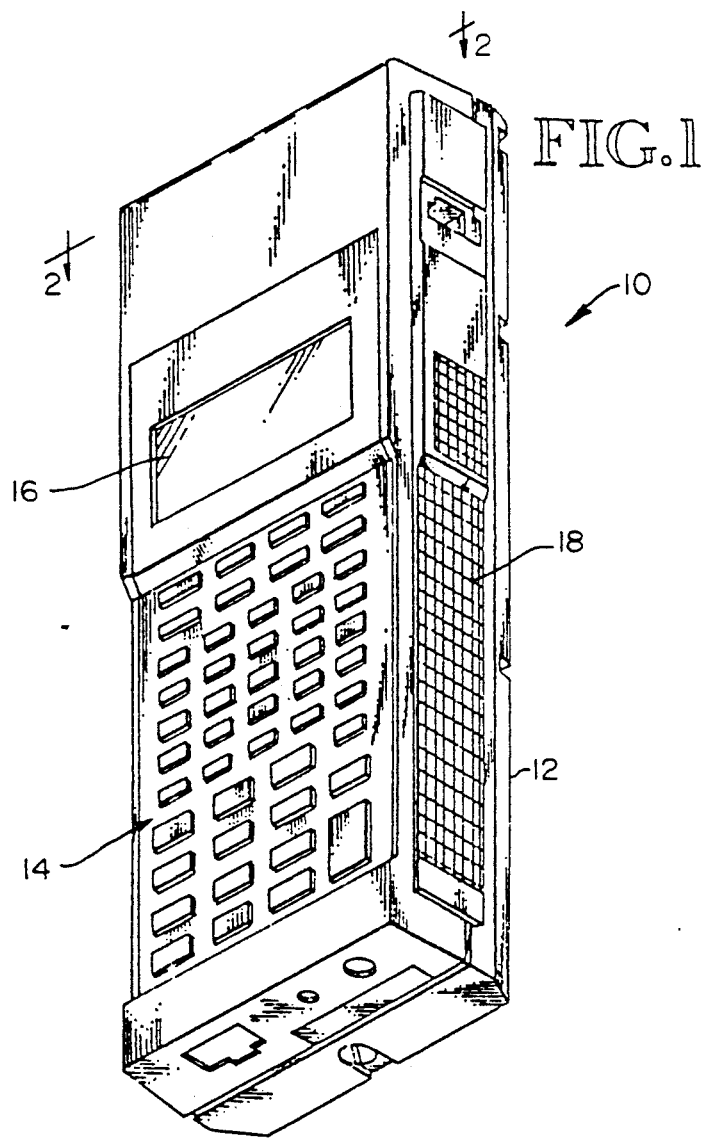
FIG. 1 is a perspective diagram of a scanning laser bar code reader.
Figure 2:
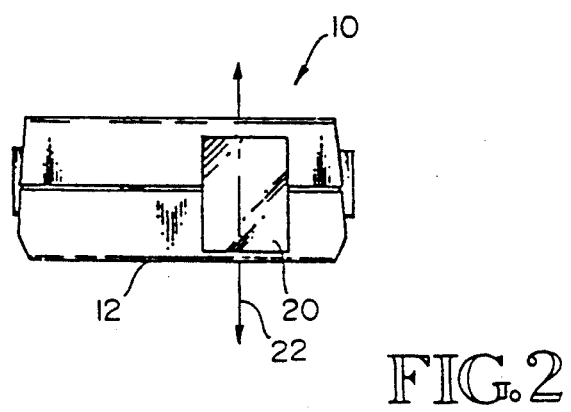
FIG. 2 is an end-on view of the top end of the scanning laser bar code reader shown in FIG. 1.

One embodiment of a laser scanner of the type with which the inventive circuit is intended to operate is shown in FIGS. 1 and 2. FIG. 1 is a perspective diagram of the laser scanner. FIG. 2 is an end-on view of the top end of the laser scanner shown in FIG. 1. The laser scanner 10 contains electronic circuitry and optical components contained within a case 12. It includes a keyboard 14 and liquid crystal display (LCD) 16 for the display of bar codes which have been read by the laser scanner 10 as well as for programming a microprocessor (not shown) contained within the laser scanner 10.

Upon actuating a pair of opposed triggers 18 (one shown in FIG. 1), the laser scanner 10 is activated, as will be described subsequently, to produce a scanning beam 22 of laser light. The scanning beam 22 passes through the window 20 placed in the top end of the laser scanner 10, as shown in FIG. 2. The scanning occurs in the plane 24 (shown in FIG. 2). The light from the scanning beam 22 is projected forwardly of the laser scanner 10. If it reaches a surface, some of the impinging energy returns to the window 20. If the reflecting surface happens to contain bar code symbology which the scanning laser beam impinges upon, the returning light will be modulated by the pattern of reflectives which the bar code symbology contains. The light received by the laser scanner 10, if it is reflected from a bar code symbology, can be amplified and processed by circuitry in accordance with techniques which are conventional to those skilled in the art of bar code reader design.

The wavelength of the beam 22 (see FIG. 3) of laser light produced within the laser scanner 10 is determined by the laser light source which is contained in the laser scanner 10. The laser light source can produce a wavelength beyond the range of human vision ("invisible") or a wavelength within the range of human vision ("visible"). If an invisible laser beam is used to read the bar code symbology, it will generally be necessary to include an auxiliary light beam to be used by the operator of the laser scanner 10 to place the scanning beam 22 on the bar code symbology.

Figure 3:
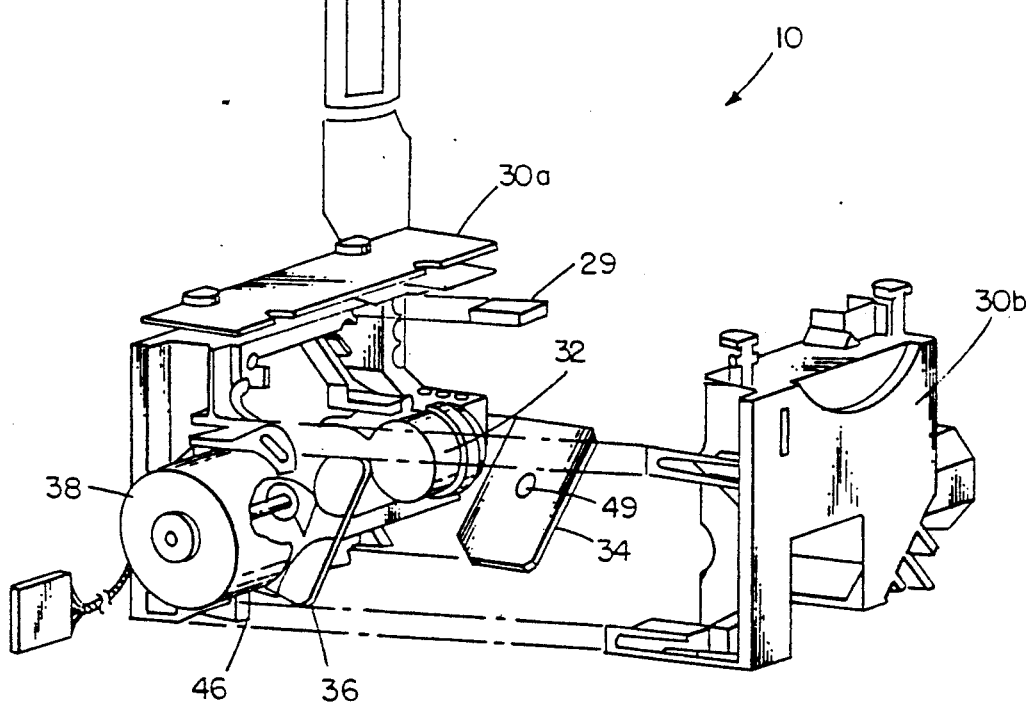
FIG. 3 is an exploded perspective view of the optics portion of the scanning laser bar code reader shown in FIG. 1.
Figure 4:
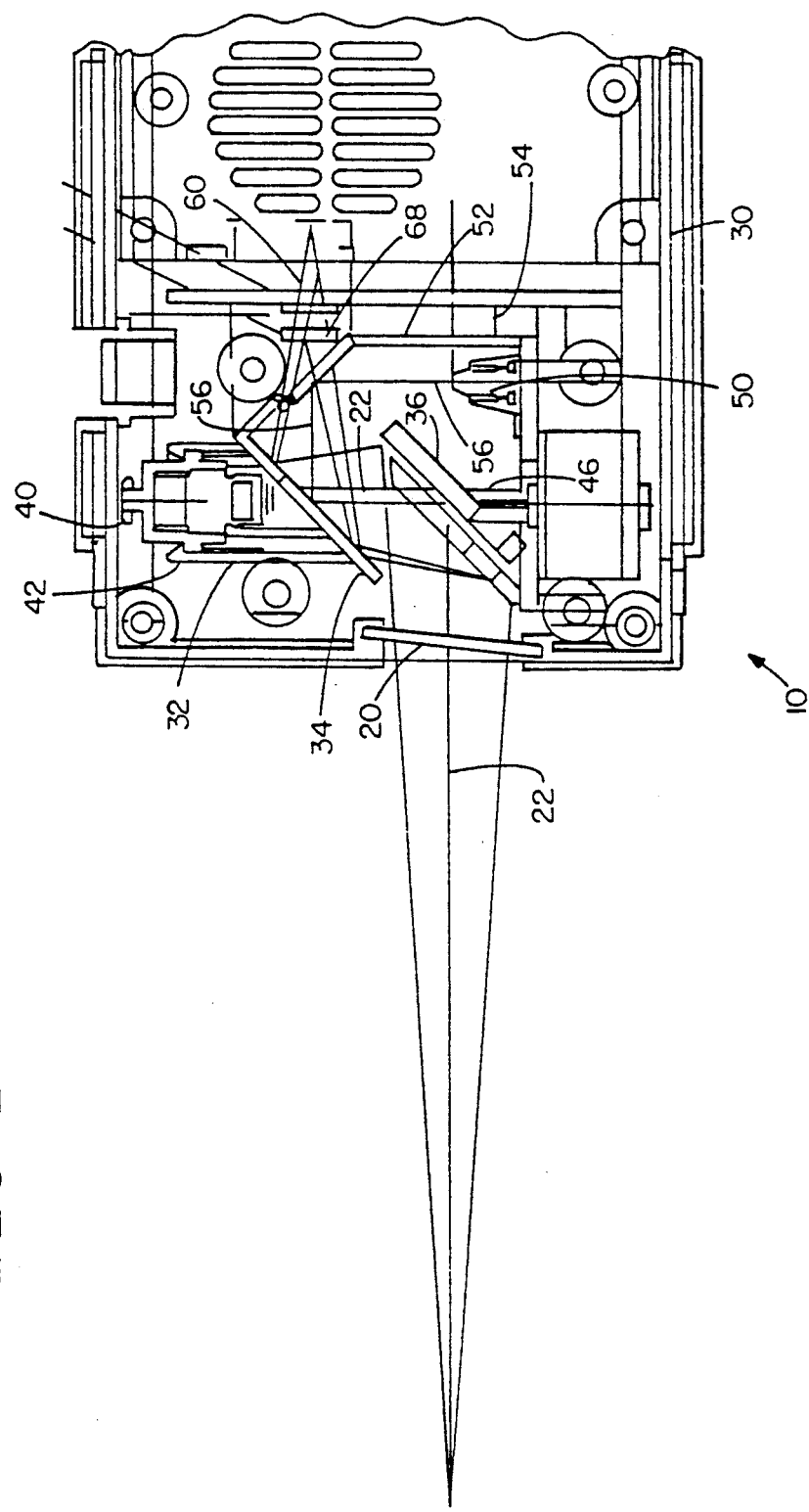
FIG. 4 is a top view of the optics portion of the scanning laser bar code reader shown in FIG. 1.

FIG. 3 is an exploded perspective view of the optics portion of the laser scanner 10, shown in FIG. 1. FIG. 4 is a top view of the optics portion of the scanning laser bar code reader shown in FIG. 1. The laser scanner 10 shown in FIGS. 3 and 4 uses an invisible beam to scan the bar code symbology. Accordingly, in order to properly orient the scanning beam 22, the scanner must also produce a spotting (or "finder") beam which is scanned in the same plane 24 as the scanning light beam 22.

The optics portion of the internal components of the laser scanner 10 is preferably included on a two-piece support frame 30. Support frame 30 include parts 30a and 30b which snap together to form a unitary support for the optical and associated components. The components in the support frame 30 can be separated into three categories. One category includes the components which deal with generating and transmitting the scanning beam 22. Another category includes the components which deal with generating and transmitting the spotter beam. The third category includes the components which deal with receiving any light which may be returning as a result of transmitting the scanning beam 22.

Those components in the first category include a laser diode 32, a turning mirror 34, an oscillating optical element 36, and a motor 38. The laser diode 32 is supplied with electrical power through electrical leads 40 by electronic circuitry contained elsewhere in the laser scanner 10. Associated with the laser diode 32 is a holder 42 which contains and holds, as a fixed assembly, lenses and other optical elements which are required to form the scanning beam 22 into the desired form. For example, the scanning beam 22 may be generated from the beam of laser light produced by the laser diode 32 by passing the beam from the laser diode 32 through one or more lenses to aid in focussing the scanning beam 22 at a particular plane exterior to the laser scanner 10 and/or through an aperture stop to reshape the beam to have a desired cross-section.

After the scanning light beam 22 passes through the optical elements held by the holder 42, it passes through a hole 44 in the turning mirror 34 to the oscillating optical element 36. The oscillating optical element 36 is attached to the motor 38 by the shaft 46, which causes the oscillating optical element 36 to oscillate with the motor 38 about the axis aligned with the shaft 46. Plane 24 (see FIG. 2) is perpendicular to the axis aligned with the shaft 46. The scanning beam 22 reflects from the oscillating optical element 36 and is directed through the window 20 within the plane 24 in accordance with the position of the oscillating optical element 36.

The components which deal with generating and transmitting the spotter beam include light-emitting diode (LED) 50 and dichroic mirror 52. The LED 50 is chosen so that the light that it emits is at a wavelength that is visible to the human eye. The LED 50 is contained within a housing 54 that shapes the light emitted by LED 50 to a narrow beam, suitable for defining a very narrow spot on any surface toward which it may be projected. The spotter beam 56 from the LED 50 which is transmitted from the housing 54 is directed onto the center of the dichroic mirror 52, which has preferential reflective properties which depend upon the wavelength of any light that may impinge upon it. Dichroic mirror 52 is chosen so that it causes the spotter beam 50 to be directed onto the turning mirror 34, while it transmits light at the wavelength of the scanning beam 22. From this point, the light in spotter beam 56 follows the same path as the light in the scanning beam 22. Spotter beam 56 is essentially coincident with scanning beam 22, so that the user can be assured that when the spotter beam 56 is visible on an object, the scanning beam 22 is also scanning that same object.

Any light that is received due to reflections from an object, such as a bar code, which is exterior to the laser scanner 10 is transmitted through the window 20. The window 20 preferably will include a cover plate to protect the interior of the laser scanner 10 from contaminants outside the laser scanner 10. The returning light is reflected by the oscillating optical element 36 onto the turning mirror 34, and then onto the dichroic mirror 52. The dichroic mirror 52, which has been selected to transmit the wavelength of the received light, transmits the light to the photodiode 60 after the light passes through a filter 62 located behind the dichroic mirror 52. The oscillating optical element 36 is shaped so that essentially all of the received light energy is directed to photodiode 60. This maximizes the strength of the signal produced by the photodiode 60, thereby improving the performance of the electronic circuitry which processes the signals produced by the photodiode 60.

Figure 5:
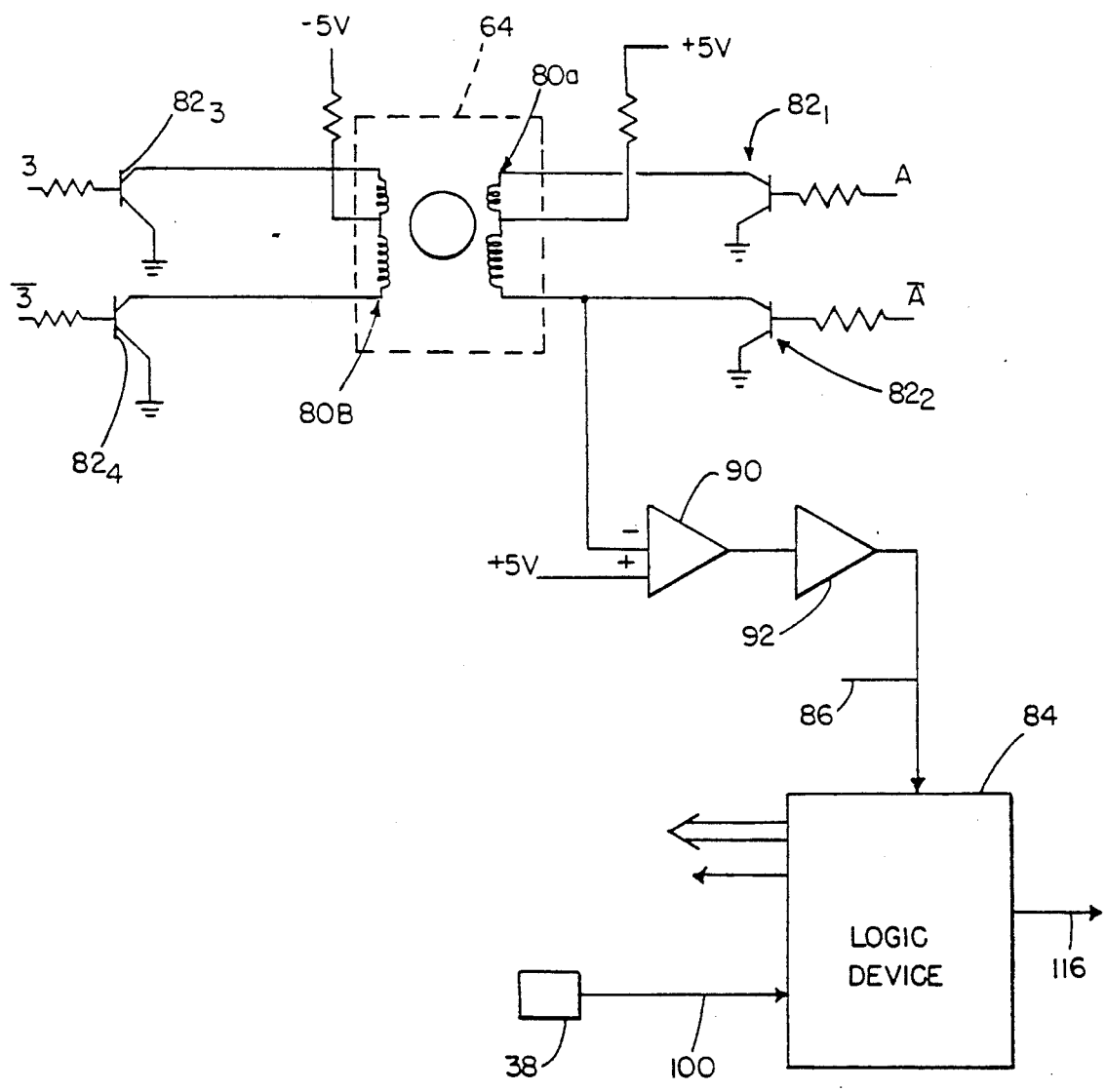
FIG. 5 is a schematic diagram of the circuitry of the motor drive electronics of the scanning laser bar code reader shown in FIG. 1.

FIG. 5 is a schematic diagram of the circuitry of the motor drive electronics of the scanning laser bar code reader shown in FIG. 1. The motor 38 is a stepper motor having, for example, the capability of producing steps which are eighteen degrees wide. The motor 38 includes two windings 80A and 80B. Each of the windings 80A and 80B is center-tapped, dividing the winding into two legs. The center of each of the windings is held at a substantially fixed first voltage, such as the supply voltage for the electronic circuit of the laser scanner 10. Typically, the supply voltage is five volts. Each of the legs of the two windings 80A and 80B can be excited separately. To accomplish this, the end of each of the legs is capable of being grounded (or held at some other voltage, if appropriate) respectively through a circuit including one of the transistors $82_1, \ldots, 82_4$. For example, if an appropriate signal is applied at point A, the gate of the transistor $82_1$ will cause current to pass through the upper leg of the winding 80A. This will cause the motor 38 to rotate slightly. If signals are applied to points A, $\overline{A}$, B, and $\overline{B}$ in the correct order, the motor 38, and consequently, the oscillating optical element 36, can be caused to oscillate. This, in turn, will cause the light beam 22 to be scanned through the window 20. It will also cause the light received from the direction in which the light beam 22 is being transmitted to be focused on the photodiode 60. If the signals are applied properly to the points A, A, B, and B, the light beam 22 can be caused to move in successive passes within an angular range having two angular extremes. If desired, the motion of the light beam 22 between extremes can be made to have a substantially constant angular velocity.

The signals applied to the points A, $\overline{A}$, B, and $\overline{B}$ can be generated by an electronic logic device 84. Device 84 also receives a pulse train, or other appropriate signal, from an oscillator 86, as well as a motor motion detect signal on line 88.

The motor motion detect signal can be generated from one of the legs of one of the windings 80A or 80B. For example, assuming that the motor motion detect signal is generated from the lower leg of the winding 80A, the summing amplifier 90 compares the voltage on the lower leg with a reference voltage. The electromotive force voltage is produced in the lower leg of winding 80A by movement of the motor 38. Coincident with the voltage is a voltage that is induced in the leg by electromagnetic coupling. The induced voltage is produced by the voltage used to power the upper leg of the winding 80A. The resulting voltage in the leg that is being monitored for the presence of electromotive force voltages is easiest to recognize when no signal is applied to point $\overline{A}$. The result of this comparison is passed on to the thresholding device 92 to produce the motor motion detect signal. The absence of a motor motion detect signal under these conditions must mean that either the motor 38 is not moving or the wire forming the lower leg of winding 80A is broken. Assuming that the wire is not broken, the presence of a signal on the line 88 gives an indication that the motor 38 is not moving, even though appropriate signals are being applied by logic device 84 to the legs of its windings 80A and 80B.

Logic device 84 may be produced as a gate array. In response to a signal generated when the user simultaneously activates both of the triggers 18, the logic device 84 generates a number of signals. Among the signals it generates are the signals required to drive the motor 38 at points A, $\overline{A}$, B, and $\overline{B}$, a "Start of Scan" signal, and a "Motion OK" signal. The "Start of Scan" signal is directed to other electronic circuitry in the laser scanner 10 to initialize signal processing which reads the bar code symbology (if any) as represented by the signal produced by the photodiode 60. If the "Motion OK" signal indicates that the motor 38 is not working, other circuitry connected to logic device 84 within the laser scanner 10 can cause the laser diode 32 to be deactivated.

Figure 6A:
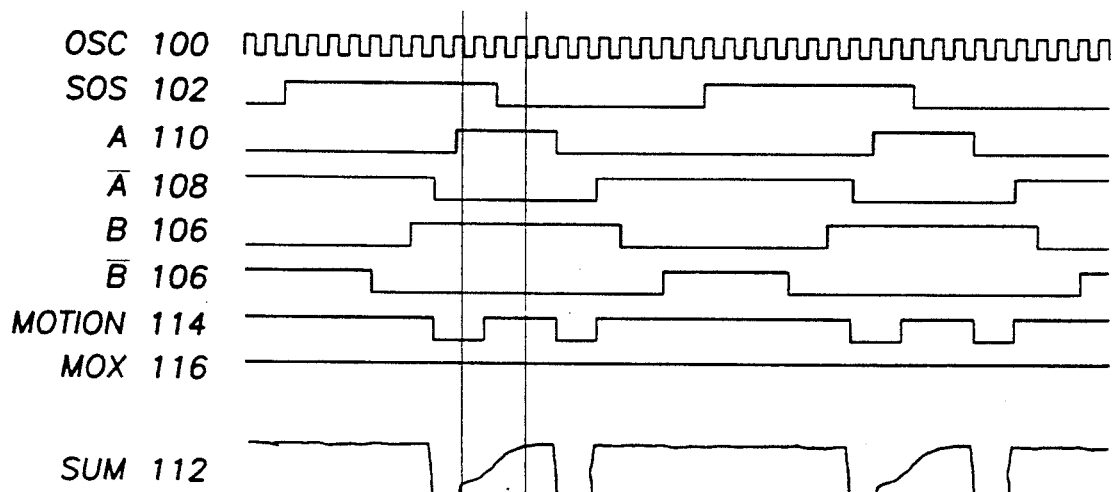
FIG. 6A is a signal timing diagram of the operation of the circuitry of the motor drive electronics shown in FIG. 5, showing the signals to be expected when the motor is moving.

FIG. 6A is a signal timing diagram of the operation of the circuitry of the motor drive electronics shown in FIG. 5, showing the signals to be expected when the motor 38 is moving. To keep the oscillating optical element 36 at one end of its range of angular travel, the lower legs of the two windings 80A and 80B are activated, while the two upper legs are not activated. The range of angular travel occurs between two angular extremes that are, for example, twenty degrees apart. If it is desired to cause the oscillating optical element 36 to scan the laser beam 22 forty times per second, the oscillator 86 can produce a square wave train 100 at a rate of 800 Hz.

When the logic device 84 determines that another scan of the scanning beam 22 is appropriate, it issues a "Start of Scan" signal 102. As a result, the logic device 84 causes the voltages applied to the points $\overline{B}$, B, $\overline{A}$, and A to change state sequentially, and then to change state again, in the signal 104 applied to point $\overline{B}$ from a high value to a low value. This change occurs three periods of the oscillator 86 after the Start of Scan signal 102 is issued. The next change in signal, that of the signal 106 applied to the point B, is from a low value to a high value. This occurs two oscillator periods after the change in signal 104. Signal 108, which is applied to the point $\overline{A}$, is the next to change. It changes from a high level to a low level, one period of the oscillator 86 after signal 106 first changes. The last signal to change, signal 110, which is applied to point A, changes from a low value to a high value two oscillator periods after signal 108 first changes.

During the period after each of the signals 104, 106, 108, and 110 have changed once and before they have changed back, no signal applied to points $\overline{A}$ and $\overline{B}$. Accordingly, either of the two legs to which these points are connected are suitable to sample for electromotive force voltages induced by motor motion. Assuming, as is shown in FIG. 5, that the lower leg of winding 80A is sampled during this period of unchanging signals, logical signals indicative of motor motion can be produced.

The output of the summing amplifier 90 is shown as signal 112 in FIG. 6A. This signal is put in a digital form by passing it through the thresholding device 92. The result is the motion signal 114, which is high whenever the output of the summing amplifier 90, signal 112, is greater than the threshold supplied to the thresholding device 92. As can be seen from FIG. 6A, the signal in the lower leg of the winding 80A when both the winding of the lower leg is intact and the motor 38 is moving is still low soon after signal 110 first changes state, but goes high before signal 110 changes state again.

As described above, this signal is the result of both the electromotive force voltage and voltages induced by signals in the other legs of the windings 80A and 80B. It has been determined experimentally that the waveform induced in the leg of the winding that is being monitored is very repeatable. The only effects which disrupt the repetitive nature of this waveform are due to winding wires which break or effects which cause the velocity characteristics of the motor 38 to change. For example, something interfering with the normal oscillation of the motor 38 will disrupt the signal in the monitored leg.

Any disruptive effects in the normal oscillation of the motor 38 can, accordingly, be detected by making samples of the voltage in the monitored leg at appropriate times during the period when the monitored leg is not being drive by the logic device 84. These times generally occur just before the undisrupted signal crosses the threshold imposed by the thresholding device 92 from below and just before the undisrupted signal passes the threshold from above. It has been determined that if the second signal sample is not greater than the first signal sample the motor is not operating normally, whether due to a broken winding wire or something interfering with the motion of the motor. Under some circumstances, it may be appropriate to sample the signal in the monitored leg more than twice. These two or more samples can be stored and compared in the logic device 84, which determines whether the motor is moving properly. If it is, the "Motion OK" signal 116 is at the high level.

Figure 6B:
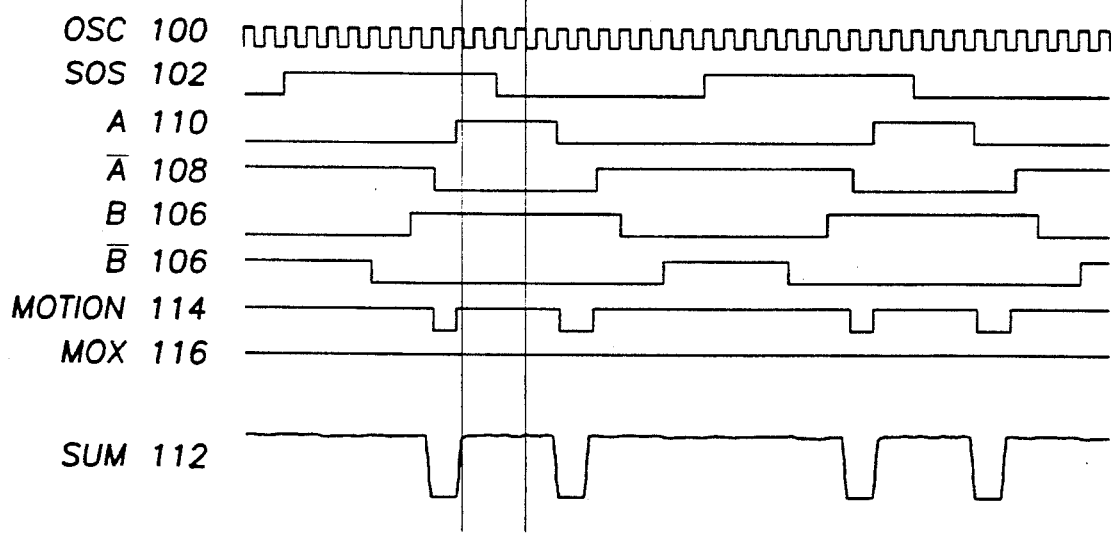
FIG. 6B is a signal timing diagram of the operation of the circuitry of the motor drive electronics shown in FIG. 5, showing the signals to be expected when the motor is not moving.

FIG. 6B is a signal timing diagram of the operation of the circuitry of the motor drive electronics shown in FIG. 5, showing the signals to be expected under one circumstance when the motor is not moving. Each of the signals is referenced identically to their reference in FIG. 6A. In the case shown in FIG. 6B, however, the motor 38 is being held stationary. Accordingly, the voltage produced by the summing amplifier 90 rises quickly from the low state to the high state. This causes both samples of the signal 114 to be high, indicative that either the motor is not moving or the wire in the leg that is being sampled is broken.

While the detailed description above has been expressed in terms of a specific example, those skilled in the art will appreciate that many other circuits could be used to accomplish the purpose of the disclosed inventive apparatus. Accordingly, it can be appreciated that various modifications of the above-described embodiments may be made without departing from the spirit and the scope of the invention. Therefore, the spirit and the scope of the present invention are to be limited only by the following claims.

I claim:

1. A motor motion detection circuit for a scanning device for producing an oscillatory motion of an optical element, comprising:

a stepper motor connected to the optical element, the stepper motor having two windings, each of the windings having two ends and a center therebetween, each center being held at a substantially fixed first voltage and each of the ends of each of the windings having a second voltage selectively applied thereto to drive the motor in the oscillatory motion, the second voltage being different from the first voltage, the windings being arranged so that any motion of the motor produces electromotive force voltages in each of the windings; and means for producing a motor motion detection signal when it detects an electromotive force voltage in at least one of the windings.

2. The motor motion detection circuit of claim 1 wherein the means for producing a motor motion detection signal comprises means for taking two samples of the electromotive force voltage in the one winding and for comparing the two samples.

3. The motor motion detection circuit of claim 2 wherein the means for producing a motor motion detection signal further comprises logic means for producing the motor motion detection signal only when the two electromotive force voltage samples are not substantially equal.

4. The motor motion detection circuit of claim 3 wherein the means for producing a motor motion detection signal comprises logic means for application of the second voltage to each of the ends of the windings when it does not detect the motor motion detection signal.

5. The motor motion detection circuit of claim 1 wherein the means for producing a motor motion detection signal comprises logic means for application of the second voltage to each of the ends of the windings when it does not detect the motor motion detection signal.

6. The motor motion detection circuit of claim 1 wherein the first voltage is an electrical supply voltage and the second voltage is an electrical ground voltage.

7. The motor motion detection circuit of claim 1 wherein the oscillatory scanning motion occurs about a predetermined fixed axis relative to the stepper motor.

8. The motor motion detection circuit of claim 7 wherein the oscillatory scanning motion is limited to occur between predetermined first and second angular limits.

9. The motor motion detection circuit of claim 8 wherein the oscillatory scanning motion consists of alternating first and second motions, the first motion being a movement of the motor from the first predetermined angular limit to the second predetermined angular limit and the second motion being a movement of the motor from the second predetermined angular limit to the first predetermined angular limit.

10. The motor motion detection circuit of claim 8 wherein the motor moves with a first substantially constant velocity throughout the first motion and a second substantially constant velocity throughout the second motion.

11. A scanning device for producing an oscillating scanning beam of light for reading a symbology, comprising:

means for producing a beam of light;

an optical element;

means for directing at least a portion of the beam of light onto the optical element, the optical element redirecting the portion of the beam of light toward the symbology;

voltage-producing means for producing a substantially fixed first voltage;

a stepper motor connected to the optical element and the voltage-producing means, the stepper motor having two windings, each of the windings having two ends and a center therebetween, the center of each of the windings being held at the substantially fixed first voltage and each of the two ends of each of the windings having a second voltage selectively applied thereto to drive the motor in an oscillatory scanning motion, the second voltage being different from the first voltage, the windings being arranged so that any motion of the motor produces electromotive force voltages in each of the windings; and means for producing a motor motion detection signal when it detects an electromotive force voltage in at least one of the windings.

12. The scanning device of claim 11 wherein the means for producing a motor motion detection signal comprises logic means for suspending holding the two ends of the center-tapped windings at the second voltage when it does not detect the motor motion detection signal.

13. The scanning device of claim 11 wherein the means for producing a motor motion detection signal comprises means for taking two samples of the electromotive force voltage in the winding and for comparing the two samples.

14. The scanning device of claim 13 wherein the means for producing a motor motion detection signal further comprises logic means for producing the motor motion detection signal only when the two electromotive force voltage samples are not substantially equal.

15. The scanning device of claim 11 wherein the first voltage is an electrical supply voltage and the second voltage is an electrical ground voltage.

16. The scanning device of claim 11 wherein the oscillatory scanning motion occurs about a predetermined fixed axis relative to the stepper motor.

17. The scanning device of claim 16 wherein the oscillatory scanning motion is limited to occur between predetermined first and second angular limits.

18. The scanning device of claim 17 wherein the oscillatory scanning motion consists of alternating first and second motions, the first motion being a movement of the motor from the first predetermined angular limit to the second predetermined angular limit and the second motion being a movement of the motor from the second predetermined angular limit to the first predetermined angular limit.

19. The scanning device of claim 18 wherein the motor moves with a first substantially constant velocity throughout the first motion and a second substantially constant velocity throughout the second motion.

* * * * *

UNITED STATES PATENT AND TRADEMARK OFFICE
CERTIFICATE OF CORRECTION

PATENT NO. : 5,216,533
DATED : June 1, 1993
INVENTOR(S) : George C. Wright

It is certified that error appears in the above-identified patent and that said Letters Patent is hereby corrected as shown below:

In column 9, claim 10, line 1, please delete "8" and substitute therefor --9--.

Signed and Sealed this

First Day of February, 1994

BRUCE LEHMAN

Attest:

Attesting Officer

Commissioner of Patents and Trademarks